Patented Mar. 25, 1947

2,418,000

UNITED STATES PATENT OFFICE 2,418,000

PROCESS FOR PREPARING METHYLENE DERIVATIVES OF HYDANTOIN

Joseph Frederic Walker, Lewiston, N. Y., assignor to E. I. du Pont de Nemours & Company, Wilmington, Del., a corporation of Delaware No Drawing. Application February 7, 1945, Serial No. 576,706

4 Claims. (Cl. 260—309.5)

This application is a continuation-in-part of my copending application Serial No. 434,436, filed March 12, 1942.

This invention relates to the preparation of monomeric N,N' methylene bis-hydantoins and to certain new chemical compounds thereby produced. More particularly, it relates to the preparation of N,N' methylene bis-hydantoins, including bis-hydantoins methylated in the 5- position such as bis-5-monomethyl and bis-5,5-dimethyl hydantoin, by reacting the hydantoin with formaldehyde and concentrated hydrochloric acid in an aqueous reaction mixture in which the amount of water is strictly limited.

The invention also relates to certain new chemical compounds which can readily be prepared by this process, including N,N' methylene bis-5,5-dimethyl hydantoin. The resulting methylene bis-hydantoins form bivalent salts with ammonia, alkali and alkaline earth metal hydroxides, which salts are highly soluble in water. Certain metallic salts, such as salts of copper, iron and nickel, are precipitated when solutions of salts of these metals are added to solutions of highly soluble alkali metal N,N' methylene bis-hydantoin salts.

Hydantoin, a chemical compound having the formula

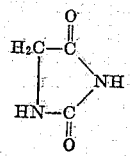

and its 5-monomethyl and 5,5-dimethyl derivatives are compounds which are either commercially available or may be readily prepared from commercially available materials.

The principal object of this invention is the development of a new and improved process for the preparation of N,N' methylene bis-hydantoins, and N,N' methylene bis-hydantoins methylated in the 5- position, by reacting a hydantoin with formaldehyde and concentrated hydrochloric acid in an aqueous reaction mixture under conditions wherein the amount of water is strictly limited. By carrying out the reaction in this way, it is possible to attain another object of this invention, the preparation of certain new chemical compounds constituting N,N' methylene bis-hydantoins and metal salts thereof. These and still further objects of my invention will become apparent from the ensuing disclosure of certain preferred embodiments thereof.

The above objects may be accomplished, in general, by reacting a hydantoin with formaldehyde in an aqueous reaction mixture containing, at the initiation of the reaction, the hydantoin and formaldehyde in the approximate proportion of one mole of formaldehyde for each two moles of hydantoin, water in an amount between 13% and 30% by weight of the reaction mixture, and at least one part by weight of hydrogen chloride for each two parts water. No maximum hydrogen chloride content need be specified since the reaction mixture may, if desired, be saturated with hydrogen chloride. To secure the best results, it is preferred that the reaction mixture contain between 18% and 27% water.

By carrying out the reaction under these conditions yields of the desired product in the neighborhood of 90% of the theoretical or better are readily secured. As contrasted with these yields, attainable when the water content is between 13% and 30%, and preferably is between 18% and 27% for best results, I have carried out the same reaction under conditions wherein there was present in the reaction mixture amounts of water greater than 30% and have obtained only very low yields of the desired product. As a typical illustration, when the water content of the reaction mixture is about 32% by weight based on the total weight thereof, I have found that the yields are approximately 19% or less.

The reaction mixture, containing the proper proportions of the components above set forth may be obtained by adding the hydantoin to concentrated hydrochloric acid in which anhydrous formaldehyde gas or paraformaldehyde has been dissolved. Alternatively, the hydantoin, including the monomethyl or dimethyl derivatives thereof, may be added to a 37% formaldehyde solution in which hydrogen chloride has been dissolved. As an equivalent procedure, hydrogen chloride may be added to a mixture of formaldehyde solution and the hydantoin. Compounds liberating formaldehyde in the presence of an acid catalyst, such as paraformaldehyde or trioxane, may also be utilized and may be added directly to the hydantoin and hydrochloric acid.

As above stated, the hydantoin and the formaldehyde should be present in the reaction mixture in the approximate proportion of one mole formaldehyde for each two moles of hydantoin. If, in preparing the reaction mixture, it is inexpedient to have hydantoin and formaldehyde in the exact proportions referred to, it is then preferred that the hydantoin, rather than the formaldehyde, be in excess. Excess hydantoin, i. e., in excess of two moles per mole of formaldehyde, does not react and hence must be recovered or wasted. Excess formaldehyde, on the other hand, favors formation of resinous by-products.

In general, the reaction is carried out by agitating the reaction mixture for a period of approximately one hour. No heat is applied during the process, although as the result of the mildly exothermic character of the reaction, reaction temperatures range from room temperatures to approximately 50° C. At the end of this period the reaction mixture is thick with the desired product and the reaction may be allowed to complete itself on standing. The product, which is substantially insoluble in water, may be isolated by breaking up the reaction mixture in an excess of water, removing the product by filtration, and subjecting it to drying either in an oven or by any other expedient.

The methylene bis-hydantoins prepared by this procedure are colorless, high-melting solids, and are substantially insoluble in water, alcohol, and other common solvents. I have found that they form with alkali metal, ammonia and alkaline earth metal hydroxides, bivalent salts which salts are very soluble in water. Salts of metals such as copper, iron and nickel are precipitated when solutions of salts of these metals are added to solutions of the alkali metal salts.

Methylene bis-dimethyl hydantoin, prepared by reacting 5,5-dimethyl hydantoin with formaldehyde and concentrated hydrochloric acid in accordance with the method described above, is a new chemical compound having a melting point of 295–296° C. It is soluble in water at room temperature (25° C.) to the extent of approximately 0.5 gram per 100 cc. of water. Boiling water dissolves about 2 grams of the compound per 100 cc. Its synthesis in practically quantitative yield from 2 moles dimethyl hydantoin and one mole formaldehyde, together with its analyzed nitrogen content, establishes the formula $C_{11}H_{16}O_4N_4$. Its formation and probable structural formula may be indicated as follows:

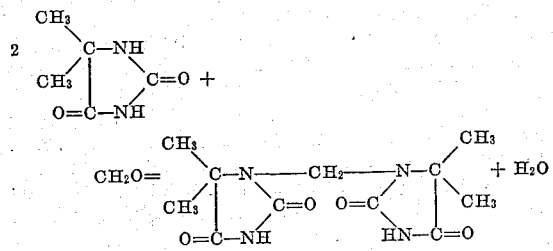

The structure of its bivalent sodium salt, $$Na_2C_{11}H_{14}O_4N_4$$

is probably as follows:

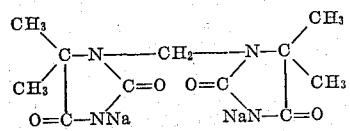

As examples illustrative of the method, and yielding the new chemical compounds described above, the following may be given:

EXAMPLE 1

*Methylene bis-dimethyl hydantoin*

To 150 cc. of 37% concentrated hydrochloric acid (specific gravity 1.19) were added 256 grams (2 moles) of pure 5,5-dimethyl hydantoin and 32 grams of paraformaldehyde (95% $CH_2O$), equivalent to one mole of formaldehyde. The somewhat pasty mixture was agitated for approximately forty-five minutes, whereupon a practically clear solution resulted. From this clear solution solid separated, until at the end of an additional half hour a solid crystalline mass was obtained. The reaction was mildly exothermic, and as the result the temperature of the reaction mixture rose from room temperature to about 30° C., and then fell off. No heat was applied to the reaction mixture.

The reaction mixture was allowed to stand over-night and then broken up in approximately two liters of cold water. The solid product was filtered off and washed with additional water until free of acid. It was then dried by heating for approximately three hours at a temperature of 130° C. The resulting dry product was a colorless powder which, on heating, melted at a temperature of 295° C. The yield was 235 grams, or 88% of theory. The reaction mixture contained 24% of water, based on its total weight.

A sample of the product was specially purified by recrystallization from hot water and analyzed to determine its nitrogen content. The nitrogen content was in agreement with the empirical formula, $C_{11}H_{16}O_4N_4$, for methylene bis-dimethyl hydantoin.

EXAMPLE 2

*Methylene bis-hydantoin*

To a mixture of 5.0 grams of hydantoin and 0.8 gram of paraformaldehyde there were added 3.5 cc. of concentrated hydrochloric acid. The mixture was agitated at room temperature for approximately one hour and then allowed to stand over-night. The solid reaction mass was broken up in water, filtered, and dried. A yield of 4.6 grams of dry methylene bis-hydantoin (87% of theory) was obtained. The water content of the reaction mixture was 26.7%.

The resulting product, methylene bis-hydantoin, melted at 292–296° C. It was readily soluble in dilute alkalies, from which it could be precipitated unchanged by the addition of an acid.

For purposes of comparison, the procedure of the prior art, that of Behrend and Niemeyer, Ann. 365, pages 44–45 (1909) may be described as follows. Hydantoin in the amount of 4 grams, and 5 grams of 40% formaldehyde solution were mixed with 2 grams of concentrated hydrochloric acid. The resulting reaction mixture was heated until solution occurred. The mixture was then diluted with an equal volume of water and allowed to stand. After standing several days, 1.1 grams of methylene bis-hydantoin crystallized out, this yield constituting only 26% of the theoretical. The product crystallized out melted at 283–295° C. After standing ten days, additional product in the amount of 0.8 gram crystallized out, giving a total yield of 1.9 grams, or approximately 42% of the theoretical.

It should be noted that the reaction mixture of Behrend and Niemeyer contained 66% of water.

EXAMPLE 3

*Methylene bis-dimethyl hydantoin produced by method wherein amount of water is not controlled*

Commercial 37% formaldehyde solution in the amount of 8.2 grams (containing 0.1 mole dissolved $CH_2O$) was added to 25.6 grams (0.1 mole)

of dimethyl hydantoin. To the resulting mixture there were added, with agitation, 15 cc. of concentrated hydrochloric acid (specific gravity 1.19). After one hour of agitation the mixture was allowed to stand over-night.

The following morning the mixture was treated with 300 cc. of water and filtered to remove the solid product. A yield of 5.2 grams (19% of theory) was obtained. The reaction mixture contained 32% of water.

It is apparent that when the amount of water in the reaction mixture is not controlled so as not to exceed 24–27%, the yields of desired product are very greatly reduced.

EXAMPLE 4

*Methylene bis-dimethyl hydantoin from trioxane*

A mixture of 3.0 grams of crystalline trioxane $(CH_2O)_3$, having a melting point of 63–64° C., 25.6 grams of 5,5-dimethyl hydantoin, and 15 cc. of concentrated hydrochloric acid (specific gravity 1.19) was agitated for one hour at room temperature. The reaction mixture was then allowed to stand over-night. In the morning, the reaction mixture was broken up in 300 cc. of water and filtered. The yield of methylene bis-dimethyl hydantoin was 16.4 grams, amounting to 62% of theory. It should be remarked that trioxane generates formaldehyde in the presence of an acid catalyst. The water content of the reaction mixture was about 24% by weight.

EXAMPLE 5

*Methylene bis-dimethyl hydantoin*

21.1 grams of an acid formaldehyde solution containing 3.1 grams of formaldehyde, 6.6 grams hydrogen chloride, and 11.4 grams water was added to 25.6 grams of 5,5-dimethyl hydantoin and allowed to stand for two and one-half days. At the end of this time, the solid reaction mixture was broken up in 300 cc. of water and the product filtered off and dried at 110° C.

The yield of methylene bis-dimethyl hydantoin was 25.8 grams, amounting to 96% of the theoretical. The reaction mixture contained water in the amount of 24%.

EXAMPLE 6

*Sodium salt of methylene bis-dimethyl hydantoin*

To 6.7 grams of pure methylene bis-dimethyl hydantoin there was added 0.87 N sodium hydroxide solution by means of a burette until all of the methylene bis-dimethyl hydantoin had gone into solution. The mixture was stirred during the process. Exactly 57.4 cc. of alkali were required, amounting to exactly 2 moles of sodium hydroxide per mole of methylene bis-dimethyl hydantoin, thus forming the sodium salt in solution.

By evaporating this solution to dryness, the sodium salt is isolated in the form of a white, water-soluble powder. If the solution of the salt is acidified it is decomposed, methylene bis-dimethyl hydantoin being precipitated.

EXAMPLE 7

*Calcium salt of methylene bis-dimethyl hydantoin*

A mixture of 5.4 grams methylene bis-dimethyl hydantoin and 1.0 gram calcium hydroxide was added to 50 cc. water and boiled for approximately 10 minutes. The mixture was then cooled and filtered to remove undissolved methylene bis-dimethyl hydantoin. On evaporating this filtrate, crystals of the calcium salt of methylene bis-dimethyl hydantoin were obtained. This product is readily soluble in water. On addition of acid to the aqueous solution, methylene bis-dimethyl hydantoin is liberated and precipitated from solution.

EXAMPLE 8

*Insoluble metal salts of methylene bis-dimethyl hydantoin*

A solution of 8 grams of copper sulfate in 200 cc. of water was added with agitation to a solution of 13.4 grams of methylene bis-dimethyl hydantoin and 150 cc. of 0.87 N sodium hydroxide. The resulting reaction mixture, containing the precipitated copper salt, was then boiled for about fifteen minutes and filtered. The precipitate was washed with water and dried. It had a slightly bluish color and weighed 16 grams. On analysis, it was found to contain 18.5% copper, establishing the product as the cupric salt of methylene bis-dimethyl hydantoin, $CuC_{11}H_{14}O_4N_4$.

By adding in a similar fashion a solution of ferric chloride, or a solution of nickel chloride to the solution of the sodium salt of methylene bis-dimethyl hydantoin, corresponding insoluble ferric and nickel salts are precipitated.

Various modifications of the process of which certain preferred embodiments have been described above will occur to those skilled in the art. It is, therefore, to be understood that the scope of the invention is to be determined by reference to the prior art and appended claims.

I claim:

1. A process for the production of N,N' methylene bis-hydantoins which comprises reacting a hydantoin with formaldehyde in an aqueous reaction mixture containing, at the initiation of the reaction, the hydantoin and formaldehyde in the approximate proportion of one mole of formaldehyde for each two moles of hydantoin, water in an amount between 13% and 30% by weight of the reaction mixture, and at least one part by weight of hydrogen chloride for each two parts water.

2. A process for the production of N,N' methylene bis-hydantoins which comprises reacting a hydantoin with formaldehyde in an aqueous reaction mixture containing, at the initiation of the reaction, the hydantoin and formaldehyde in the approximate proportion of one mole of formaldehyde for each two moles of hydantoin, water in an amount between 18% and 27% by weight of the reaction mixture, and at least one part by weight of hydrogen chloride for each two parts water.

3. A process for the production of N,N' methylene bis-hydantoins which comprises reacting a hydantoin with formaldehyde in an aqueous reaction mixture containing, at the initiation of the reaction, the hydantoin and formaldehyde in the approximate proportion of one mole of formaldehyde for each two moles of hydantoin, water in an amount between 13% and 30% by weight of the reaction mixture, and at least one part by weight of hydrogen chloride for each two parts water, said reaction being carried out at a temperature below 50° C.

4. A process for the production of N,N' methylene bis-hydantoins which comprises reacting a hydantoin selected from the group consisting of hydantoin, 5-monomethyl hydantoin and 5,5-dimethyl hydantoin with formaldehyde in an aqueous reaction mixture containing, at the initiation of the reaction, the hydantoin and formaldehyde in the approximate proportion of one mole of formaldehyde for each two moles of hydantoin, water in an amount between 13% and 30% by weight of the reaction mixture, and at least one part by weight of hydrogen chloride for each two parts water.

JOSEPH FREDERIC WALKER.

REFERENCES CITED

The following references are of record in the file of this patent:

UNITED STATES PATENTS

| Number | Name | Date |
|---|---|---|
| 2,155,863 | Jacobson | Apr. 25, 1939 |
| 2,225,384 | Graenacher et al. | Dec. 17, 1940 |

OTHER REFERENCES

Annalen, vol. 365, pages 38–49.